US011082946B2

United States Patent
Rune et al.

(10) Patent No.: US 11,082,946 B2
(45) Date of Patent: Aug. 3, 2021

(54) WIRELESS DEVICE, A NETWORK NODE AND METHODS THEREIN FOR OPTIMIZING PAGING IN A COMMUNICATIONS NETWORK

(71) Applicant: Telefonaktiebolaget LM Ericsson (publ), Stockholm (SE)

(72) Inventors: Johan Rune, Lidingö (SE); Icaro L. J. Da Silva, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/337,509

(22) PCT Filed: Aug. 31, 2017

(86) PCT No.: PCT/SE2017/050870
§ 371 (c)(1),
(2) Date: Mar. 28, 2019

(87) PCT Pub. No.: WO2018/070911
PCT Pub. Date: Apr. 19, 2018

(65) Prior Publication Data
US 2019/0230626 A1    Jul. 25, 2019

Related U.S. Application Data

(60) Provisional application No. 62/407,560, filed on Oct. 13, 2016.

(51) Int. Cl.
*H04W 36/18* (2009.01)
*H04W 56/00* (2009.01)
(Continued)

(52) U.S. Cl.
CPC .......... *H04W 68/02* (2013.01); *H04B 7/0617* (2013.01); *H04W 52/0209* (2013.01);
(Continued)

(58) Field of Classification Search
CPC . H04W 68/02; H04W 52/54; H04W 56/0005; H04W 76/10; H04W 52/383;
(Continued)

(56) References Cited

U.S. PATENT DOCUMENTS 8,116,829 B2 *   2/2012  Baker ............... H04B 17/0087
                                                    455/574
8,315,641 B2 *  11/2012  Chun ................ H04W 74/0833
                                                    455/452.1
(Continued)

FOREIGN PATENT DOCUMENTS

EP           3456083 B1  *   3/2020
JP         2021503776 A  *   2/2021
WO      WO 2020197449 A1  *  10/2020

OTHER PUBLICATIONS

Separation Framework: An Enabler for Cooperative and D2D Communication for Future 5G Networks by Hafiz Atta Ul Mustafa, et al Published in: IEEE Communications Surveys & Tutorials (vol. 18, Issue: 1, pp. 419-445) Jan. 2016 (Year: 2016).*

(Continued)

*Primary Examiner* — William D Cumming
(74) *Attorney, Agent, or Firm* — Sage Patent Group

(57) ABSTRACT

A network node and a method therein for optimizing paging in a wireless communications network. A wireless device operates in the communications network. The network node configures the wireless device for transmission of an UL signal and with conditions for when the wireless device should transmit the UL signal. Further, the network node receives the UL signal from the wireless device and pages the wireless device using beamformed transmission, wherein the direction of the beamformed transmission is derived at least in part from the reception of the UL signal.

20 Claims, 5 Drawing Sheets

Method performed by the network node 102,108

(51) Int. Cl.

| | |
|---|---|
| *H04W 74/00* | (2009.01) |
| *H04W 72/00* | (2009.01) |
| *H04W 52/54* | (2009.01) |
| *H04W 68/02* | (2009.01) |
| *H04B 7/06* | (2006.01) |
| *H04W 52/02* | (2009.01) |
| *H04W 72/04* | (2009.01) |
| *H04W 68/08* | (2009.01) |

(52) U.S. Cl.
CPC ..... *H04W 72/046* (2013.01); *H04W 72/0413* (2013.01); *H04W 52/0264* (2013.01); *H04W 52/0267* (2013.01); *H04W 52/0274* (2013.01); *H04W 68/08* (2013.01); *Y02D 30/70* (2020.08)

(58) Field of Classification Search
CPC . H04W 56/004; H04W 72/042; H04W 36/18; H04W 74/0833; H04W 72/0413; H04W 17/24
USPC ..... 370/329, 350, 519, 336; 455/560, 67.11, 455/57.14, 422.1, 574, 456.1, 450, 67.14
See application file for complete search history.

(56) References Cited

U.S. PATENT DOCUMENTS

| | | | | |
|---|---|---|---|---|
| 8,345,715 | B2* | 1/2013 | Baker | H04L 1/1671 370/519 |
| 8,812,009 | B2* | 8/2014 | Chun | H04W 56/0005 455/450 |
| 9,265,017 | B2* | 2/2016 | Sorrentino | H04W 52/54 |
| 9,485,062 | B2* | 11/2016 | Siomina | H04L 1/1854 |
| 9,615,289 | B2* | 4/2017 | Park | H04W 76/10 |
| 9,668,282 | B2* | 5/2017 | Chun | H04W 56/0005 |
| 9,696,406 | B2* | 7/2017 | Siomina | G01S 5/10 |
| 9,912,389 | B2* | 3/2018 | Moosavi | H04L 5/0048 |
| 9,974,084 | B2* | 5/2018 | Fodor | H04W 52/383 |
| 10,056,954 | B2* | 8/2018 | Fodor | H04B 7/0404 |
| 10,129,897 | B2* | 11/2018 | Martin | H04W 28/0205 |
| 10,165,536 | B2* | 12/2018 | Wang | H04J 11/0069 |
| 10,182,445 | B2* | 1/2019 | Baldemair | H04W 72/042 |
| 10,284,329 | B2* | 5/2019 | Tan Bergstrom | H04W 72/0413 |
| 10,298,309 | B2* | 5/2019 | Hessler | H04B 7/0632 |
| 10,334,627 | B2* | 6/2019 | Larsson | H04L 5/0053 |
| 10,455,608 | B2* | 10/2019 | Shepard | H04B 7/0452 |
| 10,476,714 | B2* | 11/2019 | Zhang | H04W 74/006 |
| 10,498,500 | B2* | 12/2019 | Rahman | H04L 5/1469 |
| 10,523,300 | B2* | 12/2019 | Malik | H04B 7/0689 |
| 10,651,964 | B2* | 5/2020 | Vikberg | H04L 1/0001 |
| 10,686,553 | B2* | 6/2020 | Baker | H04L 1/0025 |
| 10,687,219 | B2* | 6/2020 | Yerramalli | H04L 5/0044 |
| 10,772,105 | B2* | 9/2020 | Martin | H04W 72/1231 |
| 10,862,562 | B2* | 12/2020 | Malik | H04B 7/0617 |
| 2002/0002063 | A1* | 1/2002 | Miyamoto | H04W 36/18 455/560 |
| 2008/0268786 | A1* | 10/2008 | Baker | H04B 17/24 455/67.11 |
| 2009/0075599 | A1* | 3/2009 | Baker | H04L 1/0025 455/67.14 |
| 2009/0104901 | A1* | 4/2009 | Baker | H04L 1/0027 455/422.1 |
| 2010/0182992 | A1* | 7/2010 | Chun | H04W 56/0005 370/350 |
| 2013/0044737 | A1* | 2/2013 | Chun | H04W 72/0413 370/336 |
| 2014/0293927 | A1* | 10/2014 | Chun | H04W 74/0833 370/329 |
| 2015/0270868 | A1* | 9/2015 | Park | H04B 1/7143 370/329 |
| 2016/0374035 | A1* | 12/2016 | Wang | H04W 56/004 |
| 2017/0048875 | A1* | 2/2017 | Martin | H04W 28/0231 |
| 2018/0338321 | A1* | 11/2018 | Shepard | H04W 72/14 |
| 2019/0014481 | A1* | 1/2019 | Yerramalli | H04W 74/0808 |
| 2019/0059001 | A1* | 2/2019 | Yerramalli | H04L 5/0096 |
| 2019/0069307 | A1* | 2/2019 | Martin | H04W 76/38 |
| 2019/0089443 | A1* | 3/2019 | Malik | H04B 7/0689 |
| 2019/0230626 | A1* | 7/2019 | Rune | H04B 7/0617 |
| 2019/0230723 | A1* | 7/2019 | Kim | H04W 68/02 |
| 2019/0246340 | A1* | 8/2019 | Jung | H04W 24/10 |
| 2020/0029357 | A1* | 1/2020 | Shepard | H04L 5/0023 |
| 2020/0045667 | A1* | 2/2020 | Modarres Razavi | G01S 5/10 |
| 2020/0099436 | A1* | 3/2020 | Malik | H04B 7/0689 |
| 2020/0367260 | A1* | 11/2020 | Martin | H04L 5/006 |

OTHER PUBLICATIONS

Autonomous Self-Backhauled LTE Mesh Network With QoS Guarantee by Romain Favraud; Chia-Yu Chang; Navid Nikaein Published in: IEEE Access (vol. 6) Jan. 2018 (Year: 2018).*
International Search Report and Written Opinion of the International Searching Authority, PCT/SE2017/050870, dated Nov. 20, 2017, 13 pages.
Samsung, UL Measurement based Inactive Mode Mobility Aspects, 3GPP TSG-RAN WG2 Meeting #95bis, Kaohsiung, Taiwan, Oct. 10-14, 2016, R2-166291, 4 Pages.
Qualcomm Incorporated, DL and UL based mobility procedures, 3GPP TSG-RAN WG1 #86 Aug. 22-26, 2016 Gothenburg, Sweden, R1-166386, 4 Pages.
Huawei, HiSilicon, UE centric design for NR, 3GPP TSG-RAN WG2 Meeting #95 Gothenburg, Sweden, Aug. 22-26, 2016, R2-165439, 2 Pages.
Interdigital Communications, Paging Aspects for Multi-beam Operation, 3GPP TSG-RAN WG2 Meeting #97, Athens, Greece, Feb. 13-17, 2017, R2-1701193, 3 Pages.
Ericsson, Paging delivery in NR, 3GPP TSG-RAN WG2 #97, Athens, Greece, Feb. 13-17, 2017, R2-1700880, 3 Pages.
Samsung, Paging in NR—Beamforming Aspects, 3GPP TSG-RAN WG2 95bis, Kaohsiung, Taiwan, Oct. 10-14, 2016, R2-166070, 4 Pages.

* cited by examiner

Fig. 2 Method performed by the wireless device 110

Fig. 4 Method performed by the network node 102,108

WIRELESS DEVICE, A NETWORK NODE AND METHODS THEREIN FOR OPTIMIZING PAGING IN A COMMUNICATIONS NETWORK

CROSS REFERENCE TO RELATED APPLICATIONS

This application is a 35 U.S.C. § 371 national stage application of PCT International Application No. PCT/SE2017/050870 filed on Aug. 31, 2017, which in turn claims domestic priority to U.S. Provisional Patent Application No. 62/407,560, filed on Oct. 13, 2016, the disclosures and content of which are incorporated by reference herein in their entirety.

TECHNICAL FIELD

Embodiments herein relate to a wireless device, a network node and methods therein. Especially, embodiments herein relate to optimizing paging in a communications network.

BACKGROUND

Communication devices such as terminals or wireless devices are also known as e.g. User Equipments (UEs), mobile terminals, wireless terminals and/or mobile stations. Such terminals are enabled to communicate wirelessly in a wireless communication system or a cellular communications network, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications network.

The above terminals or wireless devices may further be referred to as mobile telephones, cellular telephones, smartphones, Machine Type Communication (MTC) devices, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

In LTE, a wireless device, e.g. a UE, in an RRC_IDLE state camps on a cell and while camping the wireless device monitors its paging channel associated with that cell. The wireless device is configured to monitor repeatedly occurring paging occasions and may reside in a DRX sleep mode in between the paging occasions. When the wireless device is paged at such a paging occasion, the paging is indicated on the PDCCH in the form of DL scheduling allocation addressed to the P-RNTI which is shared by all wireless devices. This DL scheduling allocation indicates the DL transmission resources on the PDSCH, where the actual paging message is transmitted. A wireless device in the RRC_IDLE state, which receives a DL scheduling allocation addressed to the P-RNTI at one of the wireless device's paging occasions, receives and reads the paging message from the allocated DL transmission resources to find out whether the paging message is intended for the wireless device. The wireless device(s) that is(are) subject to the paging is(are) indicated in the paging message through one or more wireless device paging identifiers, e.g. an S-TMSI or an IMSI, wherein each wireless device paging identifier is included in a paging record.

For a New Radio (NR) communications network, e.g. a 5G communications network, at the 3GPP RAN2#95 meeting, it has been agreed that at least one RRC state for low activity should meet the NR Cyclic Prefix (CP) latency requirement and must be capable of achieving comparable power efficiency to that of LTE's RRC IDLE state.

In the 3GPP RAN2#95 working group meeting it has been agreed that for the wireless device in the "new state", herein sometimes referred to as an RRC CONNECTED INACTIVE state, a RAN initiated notification procedure should be used to reach the wireless device. Further, it has been agreed that the associated notification related parameters should be configured by the RAN itself. However it is not clear what the final state model will be. Two possibilities exist:
1. Three states: an RRC CONNECTED state, an RRC CONNECTED INACTIVE state and an RRC IDLE state
2. Two state: an RRC CONNECTED state and an RRC IDLE state.
Wireless devices in the RRC CONNECTED INACTIVE state and the RRC IDLE state in alternative 1 and in the RRC IDLE state in alternative 2 will monitor paging channels.

It should be understood that terms the RRC CONNECTED state, the RRC CONNECTED INACTIVE state, and the RRC IDLE state sometimes may be referred to as the RRC_CONNECTED state, the RRC_INACTIVE state, and the RRC_IDLE state, respectively.

Further, it has been discussed whether the wireless device should camp on a beam or on a cell. Many companies have expressed concerns with the concept of camping on a beam, such as the need to perform beam tracking, the need to transmit system information per beam, etc. As a conclusion, it has been agreed that the wireless device should camp on the best cell just as in the LTE case.

Based this agreement, it seems straightforward to assume that the wireless device should not be aware of or be able to distinguish between beams in the RRC CONNECTED INACTIVE state and/or in the RRC IDLE state. As a consequence of that, it seems natural to assume that the wireless device should monitor a paging channel associated with the NR cell, possibly with parameters derived from the Cell ID (assumedly a locally unique cell identifier similar to the Physical Cell Identifier (PCI) in LTE) and/or obtained via system information associated with the cell. Whether paging notifications are transmitted via beamforming or broadcast becomes an implementation issue.

In a first solution, the paging channel is transmitted in a wide or omnidirectional beam or a beam covering an area 360 degrees around the transmission point, but a limited angle in the vertical dimension. For simplicity, this form of transmission is henceforth referred to as "wide beam". When it comes to mobility in the RRC IDLE state and/or in the RRC CONNECTED INACTIVE state, the majority of companies have expressed the opinion of using DL-based mobility, i.e. based on DL channel quality measurements performed by the wireless device, with a procedure inspired by LTE's cell reselection. In that case the paging message would likely be transmitted in a wide beam, e.g. in (even an omnidirectional beam, and/or in a broadcast manner, at least in some deployments where we see benefits of not beamforming/sweeping the cell IDs and possibly additional reference signals to be used for cell reselection.

However, a drawback with the first solution is coverage of wireless devices at a cell edge. Such wireless devices are sometimes in this disclosure referred to as cell edge wireless devices. The drawback is that, since the message is transmitted in a wide beam or in an omnidirectional beam there may be concerns related to the coverage of the paging message, especially for wireless devices at the cell border. This is a consequence of the NR communications network being a high-frequency (the considered frequency bands range from medium to very high carrier frequencies) system relying on beamforming to achieve good coverage. Lack of accurately directed beamforming may be compensated by beam sweeping i.e. by covering an area by transmitting several narrow beams, one after the other, by repetition of the transmitted signal e.g. by using wide beam transmission, or by encoding a large proportion of redundancy in the transmitted data. Neither of which compensation methods is resource efficient and, in addition, usage of beam sweeping or repetition implies prolonged paging channel monitoring for the wireless device, which reduces the efficiency of the DRX lower power state, e.g. the RRC CONNECTED INACTIVE state or the RRC IDLE state.

A second solution comprises periodic sweeps of narrow beams for the paging channel. An alternative to the above first solution would be a constant sweep and/or a periodic sweep of the paging channel from the network that is monitored by the wireless devices in the RRC CONNECTED INACTIVE state and/or in the RRC IDLE state wireless devices or by wireless devices in any kind of state where it is supposed to monitor paging channel.

However, a drawback with the second solution may be too much overhead. Thus, despite the fact the second solution solves the coverage problem it introduces a huge amount of overhead considering that most of the time the wireless devices in the RRC CONNECTED INACTIVE state and/or the RRC IDLE state do not have a paging message directed for them. Consequently, as mentioned above, transmitting the paging message using beam sweeping is resource inefficient and forces the wireless device to monitor the paging channel for a longer time, which counteracts the energy saving purpose of the DRX sleep mode in the RRC CONNECTED INACTIVE state and/or the RRC IDLE state.

A third solution relates to UL-based mobility in the Inactive state and/or the Idle state. An alternative to the above first and second solutions assuming DL-based mobility is to rely on UL-based mobility in the RRC CONNECTED INACTIVE state and/or possibly the RRC IDLE state. In the existing solution, the wireless device periodically transmits wireless device-specific UL beacons on a configured UL channel, i.e. configured UL time and frequency (T/F) resources. Then the wireless device waits for a RAN notification that indicates whether there is a paging message to that wireless device or not, i.e. the wireless device is essentially polling the network for DL messages.

A drawback with the third solution relates to the scalability. One of the drawbacks identified is scalability of the UL resources, e.g. the number of beacon sequences to enable each wireless device in the RRC CONNECTED INACTIVE state and/or RRC IDLE state to receive a unique beacon sequence, the T/F resources for UL channel for the beacon transmissions, the interference caused by UL beacon transmissions from numerous wireless device, etc. Herein "beacon sequence" refers to a transmission symbol, e.g. an OFDM symbol, a sequence of symbols, a signal pattern, a waveform or a waveform pattern.

SUMMARY

An aim of some embodiments disclosed herein is to overcome or mitigate at least some of the drawbacks with the prior art.

According to an aspect of embodiments herein, the object is achieved by a method performed by a network node for optimizing paging in a wireless communications network. A wireless device operates in the communications network.

The network node configures the wireless device for transmission of an UL signal and with conditions for when the wireless device should transmit the UL signal.

Further, the network node receives the UL signal from the wireless device.

Furthermore, the network node pages the wireless device using beamformed transmission, wherein the direction of the beamformed transmission is derived at least in part from the reception of the UL signal.

According to another aspect of embodiments herein, the object is achieved by a network node for optimizing paging in a wireless communications network. A wireless device is configured to operate in the communications network.

The network node is configured to configure the wireless device for transmission of an UL signal and with conditions for when the wireless device should transmit the UL signal.

Further, the network node is configured to receive the UL signal from the wireless device.

Furthermore, the network node is configured to page the wireless device using beamformed transmission, wherein the direction of the beamformed transmission is derived at least in part from the reception of the UL signal.

According to another aspect of embodiments herein, the object is achieved by a method performed by a wireless device for supporting optimization of paging in a wireless communications network. The wireless device operates in the wireless communications network.

The wireless device receives a configuration relating to an UL signal and to one or more conditions for when the wireless device is to transmit the UL signal.

Further, the wireless device determines whether or not one or more of the conditions for transmitting the UL signal are met.

Furthermore, the wireless device transmits the UL signal in accordance with the configuration when the wireless device has determined that one or more of the conditions for transmitting the UL signal are met.

According to another aspect of embodiments herein, the object is achieved by a wireless device for supporting optimization of paging in a wireless communications network. The wireless device is configured to operate in the wireless communications network.

The wireless device is configured to receive a configuration relating to an UL signal and to one or more conditions for when the wireless device is to transmit the UL signal.

Further, the wireless device is configured to determine whether or not one or more of the conditions for transmitting the UL signal are met.

Furthermore, the wireless device is configured to transmit the UL signal in accordance with the configuration when the wireless device has determined that one or more of the conditions for transmitting the UL signal are met.

According to another aspect of embodiments herein, the object is achieved by a computer program, comprising instructions which, when executed on at least one processor, causes the at least one processor to carry out the method performed by the network node.

According to another aspect of embodiments herein, the object is achieved by a computer program, comprising instructions which, when executed on at least one processor, causes the at least one processor to carry out the method performed by the wireless device.

According to another aspect of embodiments herein, the object is achieved by a carrier comprising the computer program, wherein the carrier is one of an electronic signal, an optical signal, a radio signal or a computer readable storage medium.

Since the wireless device transmits the UL signal in accordance with the configuration when it has determined that one or more of the conditions for transmitting the UL signal are met, the communications network, e.g. the network node, pages the wireless device using beamformed transmission, wherein the direction of the beamformed transmission is derived at least in part from the reception of the UL signal. Thereby, an optimized paging in the communications network is provided. This results in an improved performance in the wireless communications network.

An advantage with some embodiments herein is that they leverage the advantage of the previously proposed UL beacon based method to enable accurately directed beamforming of the paging related transmissions, e.g. paging indication and/or paging message, while avoiding the scalability problems of the prior art proposal, by introducing a mechanism whereby the UL beacon is used only in situations where narrow beamforming of the paging related transmissions is actually needed to reach the wireless device.

BRIEF DESCRIPTION OF DRAWINGS

Examples of embodiments herein will be described in more detail with reference to attached drawings in which.

DETAILED DESCRIPTION

Figure 1:
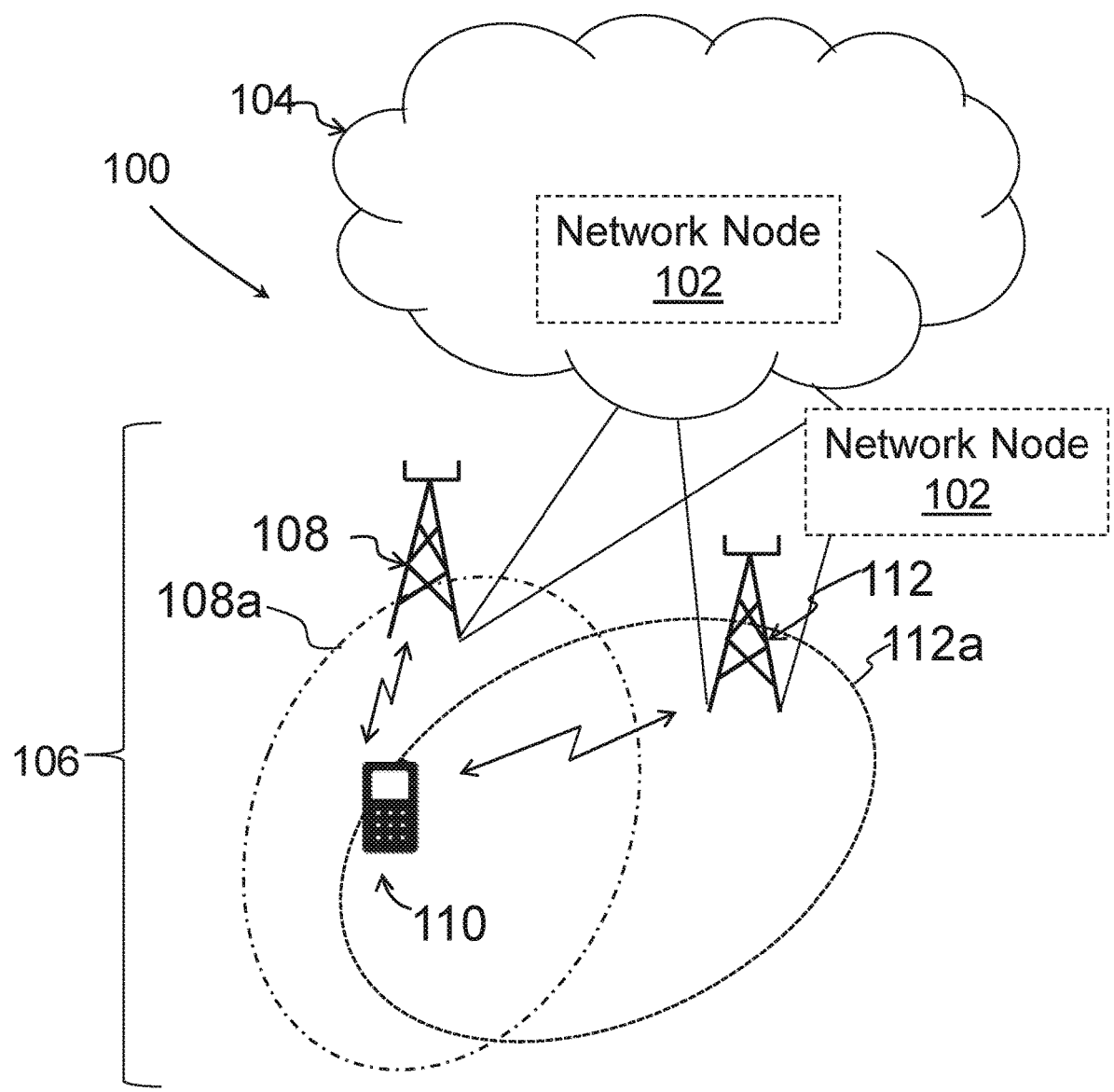
FIG. 1 schematically illustrates embodiments of a wireless communications system.

An object addressed by embodiments herein is how to improve performance in a wireless communications network.

Therefore, as mentioned above, according to embodiments herein, a way of improving the performance in the wireless communications network is provided.

Terminology

The following terminology is used in embodiments described herein and is elaborated below:

Network node: In some embodiments a more general term "network node" is used and it may correspond to any type of radio network node or any network node, which communicates with a wireless device and/or with another network node. Examples of network nodes are gNB, NodeB, eNB, MeNB, SeNB, a network node belonging to a Master Cell Group (MCG) or a Secondary Cell Group (SCG), Base Station (BS), multi-Standard Radio (MSR) radio node such as MSR BS, eNodeB, network controller, radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS), core network node (e.g. Mobile Switching Center (MSC), Mobility Management Entity (MME) etc.), Operations and Maintenance (O&M), Operations Support System (OSS), Self-organizing Network (SON), positioning node (e.g. Enhanced Serving Mobile Location Center (E-SMLC)), Mobile Data Terminal (MDT) etc.

User equipment/wireless device: In some embodiments the non-limiting terms wireless device, Mobile Station (MS) and User Equipment (UE) are used and they refer to any type of wireless device communicating with a network node and/or with another UE in a cellular or mobile communication system. Examples of UE/wireless device are Device-to-Device (D2D) UE, machine type UE or UE capable of machine to machine (M2M) communication, Personal Digital Assistant (PDA), Tablet, mobile terminals, smart phone, Laptop Embedded Equipped (LEE), Laptop Mounted Equipment (LME), Universal Serial Bus (USB) dongles, Customer premises Equipment (CPE) etc. In this disclosure the terms wireless device and UE are used interchangeably.

Note that although terminology from 3GPP standards, such as the standard for Global System for Mobile Communications (GSM), Wideband Code Division Multiple Access (WCDMA) and/or Evolved Packet System (EPS)/Long Term Evolution (LTE) is used in this disclosure to exemplify the embodiments herein, this should not be seen as limiting the scope of the embodiments herein to only the aforementioned system. Other wireless systems, such as for example a NR network, 5G network, an LTE network, a Wideband Code Division Multiple Access (WCDMA) network, a Global System for Mobile Communications (GSM) network, any 3GPP cellular network, a Worldwide Interoperability for Microwave Access (WiMAX) network, a Wireless Local Area Network (WLAN), a Low Rate Wireless Personal Access Network (LR-WPAN) as defined in e.g. IEEE 802.15.4, a BLUETOOTH network, a SIGFOX network, a ZIGBEE network, a BLUETOOTH Low Energy (BLE) network such as BLUETOOTH Smart network, or a Cellular Internet of Things (CIoT) network such as an Enhanced Coverage GSM-IoT (EC-GSM-IoT) network, a Narrow Band IoT (NB-IoT) network or a network comprising one or more wireless devices configured for Machine Type Communication (MTC) sometimes herein referred to as an eMTC network, may also benefit from exploiting the ideas covered within this disclosure.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Also note that terminology such as gNB, eNodeB and UE should be considering non-limiting and does in particular not imply a certain hierarchical relation between the two; in general "eNodeB" could be considered as device 1 and "UE" device 2, and these two devices communicate with each other over some radio channel.

Further, the description frequently refers to wireless transmissions in the downlink, but embodiments herein are equally applicable in the uplink.

In the following section, embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

FIG. 1 depicts an example of the wireless communications network 100 in which embodiments herein may be implemented. The wireless communications network 100 may be a cellular communications network such as a NR network, a 5G network, an LTE network, a WCDMA network, a GSM network, any 3GPP cellular network, or a short range communications network, such as a WLAN, an LR-WPAN, a BLUETOOTH network, WiMAX network, a SIGFOX network, a ZIGBEE network, a BLE network such as a BLUETOOTH Smart network, or a CIoT network such as an EC-GSM-IoT network, a NB-IoT network or an eMTC network, or a combination of one or more of the aforementioned communications networks just to mention some examples.

One or more network nodes 102,108 operate in the wireless communications network 100.

In some embodiments, one out of the one or more network nodes 102,108 is a core network node 102 operating in a core network 104 of the wireless communications network 100. The core network node 102 may be a Serving Mobile Location Center (SMLC), an enhanced SMLC (eSMLC), Mobile Switching Center (MSC), a Mobility Management Entity (MME), an Operation & Maintenance (O&M) node, a Serving GateWay (S-GW), a Serving General Packet Radio Service (GPRS) Node (SGSN), etc. Further, the core network may be a wireless core network such as a GERAN core network, an LTE core network, e.g. a Evolved Packet Core (EPC); a WCDMA core network; a GSM core network; any 3GPP core network; WiMAX core network; or any wireless or cellular core network. As schematically illustrated in FIG. 1, the core network node 102 may be arranged outside the core network 104.

In some embodiments, one out of the one or more network nodes 102,108 is a Radio Network Node (RNN) 108 operating in e.g. a wireless access network 106. The RNN may be a Transmission Point (TP), an Access Point (AP), a radio access node such as a BTS, a radio base station, for example an eNB, a gNB, an eNodeB, or a Home Node B, an Home eNode B or any other network node capable to serve a user equipment or a machine type communication device in a wireless communications network. Further, the wireless access network may sometimes be referred to as a Radio Access network (RAN). Further, the wireless access network 106 may be a wireless access network such as a NR access network, a 5G access network, a GERAN network, an LTE access network, e.g. an Evolved UMTS Terrestrial Radio Access Network (E-UTRAN); a WCDMA communications network; a GSM communications network; any 3GPP communications network; WiMAX communications network; or any wireless or cellular communications network. Furthermore, it should be understood that in some embodiments the core network and the wireless access network are combined into one single network or that the wireless access network may comprise the core network.

In some embodiments, the RNN 108 may be configured for wireless communication with one or more wireless devices, such as a wireless device 110, when the wireless device is located within a radio coverage area 108*a*. Herein, this is also specified as the RNN 108 manages or is configured to manage communication with one or more wireless devices in the radio coverage area 108*a*. In this disclosure, the radio coverage area 108*a* is sometimes referred to as a cluster or a cell. Further, when the wireless device 110 is located within the radio coverage area 108*a* and is served by the RNN 108 serving the coverage area 108*a*, the radio coverage area 108*a* may be referred to as a serving cell, or a serving cluster. It should be understood that more than one RNN 108 may be operating in the wireless communications network 100. For example, one or more neighboring RNNs 112 may operate in the wireless communications network 100, and each of the one or more neighboring RNNs 112 may be configured to serve a respective radio coverage area 112*a*. Furthermore, it should be understood that one RNN may be configured to serve several radio coverage areas, e.g. several cells.

Furthermore, in this disclosure, any reference to one or more cells is understood to equally refer to one or more transmission points, such as one or more RNNs, e.g. the RNNs 108, or one or more neighbouring RNNs 112 serving or managing the respective cell, e.g. the cell 108*a* or the one or more neighbouring cells 112*a*.

A wireless device 110 is operating in the wireless communications network 100. The wireless device 110, also sometimes referred to as a wireless communications device, a user equipment, a UE, a mobile station or an MS, is located in the wireless communications network 100. The wireless device 110 may e.g. be a user equipment, a mobile terminal or a wireless terminal, a mobile phone, a smartphone, a computer such as e.g. a laptop, a Personal Digital Assistants (PDAs) or a tablet computer, with wireless capability, or any other radio network units capable to communicate over a radio link in a wireless communications network. It should be noted that the term user equipment used in this document also covers other wireless devices such as Machine to Machine (M2M) devices, even though they are not handled by any user. In some embodiments, the wireless device 110 is a stationary wireless device. Thus, the wireless device 110 is sometimes in this disclosure referred to as a stationary wireless device 110. By the expression "stationary wireless device" when used herein is meant that the wireless device 110 is not moving. For example, the stationary wireless device is not moving when in use, e.g. during operation.

Some embodiments described herein comprise a method wherein mechanisms for counteracting poor coverage, e.g. when the wireless device 110, e.g. the UE, is located at the cell edge, are used only when needed. Thereby, the inherent disadvantages of such mechanisms may be avoided when the mechanisms are not needed, i.e. in the majority of the cases.

The mechanisms to be used when the wireless device 110 is in poor coverage comprise UL beacon signal transmissions and accurate beamforming of the paging related signals such as paging indication signals and/or paging message signals.

To this end, the communications network 100, e.g. by means of the network node 102,108, configures the wireless device 110 with a beacon signal and an event, e.g. a triggering event, such as one or more certain conditions to be met. When one or more of the certain conditions occur, e.g. are met, while the wireless device 110 is in an RRC CONNECTED INACTIVE state and/or an RRC IDLE state, the wireless device 110 is triggered to send an UL beacon signal over an UL channel.

The beacon signal may in some embodiments be unique for the wireless device 110, but in some other embodiments, the wireless device 110 may be assigned a beacon signal that it shares with multiple other wireless devices.

The triggering event may indicate that the wireless device 110 has poor DL coverage, e.g. based on measurement of the Synchronization Signal (SS) or any other DL reference signal or synchronization signal correlated with paging coverage (e.g. using SS received power or RSRP as the metric). The UL channel the beacon signal is transmitted on may be the PRACH, an UL channel dedicated for beacon signal transmissions or another channel used for used for UL control signalling. When the event is triggered, the wireless device 110 starts sending its UL beacon signal and keeps sending periodical beacon signals as long as one or more of the event triggering conditions remains valid. Optionally, to avoid ping-ponging between sending and not sending periodical beacon signals a hysteresis may be applied to the event triggering conditions. The hysteresis means that if the periodical transmission of UL beacon signals is turned on when the DL channel quality goes below Q (i.e. the event triggering condition), then the wireless device 110 will not turn it off again unless the DL channel quality goes above Q+H (or Q×H), where H represents the hysteresis. However, avoiding ping-ponging between sending and not sending periodical UL beacon signals is not important, as ping-ponging would not incur additional signalling load in the manner that ping-ponging between two cells causes excessive handover signalling. Ping-ponging between sending and not sending periodical beacon signals does not harm. At least unless the optional scheme is used where the network node 102,108, e.g. the RNN 108 such as the gNB, informs another entity (or entities) when reception of periodic beacon signals begins and ceases (see further below). Furthermore, even though ping-ponging between sending and not sending periodical beacon signals is expected to be harmless, avoiding it may still be preferred from yet unforeseen aspects, e.g. that it could possibly negatively impact the efficiency of the energy-saving in the wireless device during the low-power state, e.g. the RRC CONNECTED INACTIVE state and/or an RRC IDLE state. Hence, availability of the option to apply a hysteresis to the event triggering condition may be preferable.

Reception of an UL beacon signal triggers the communications network, e.g. by means of the network node 102,108, to use beamforming in the opposite direction of the received UL beacon signal, if the wireless device 110 is paged in a paging occasion following the reception of an UL beacon signal. This mechanism is optimized if the beacon signal transmissions are coordinated with paging occasions. Otherwise, the communications network, e.g. by means of the network node 102,108, uses regular paging transmission mechanisms, such as omnidirectional or wide beam transmission.

Figure 2:
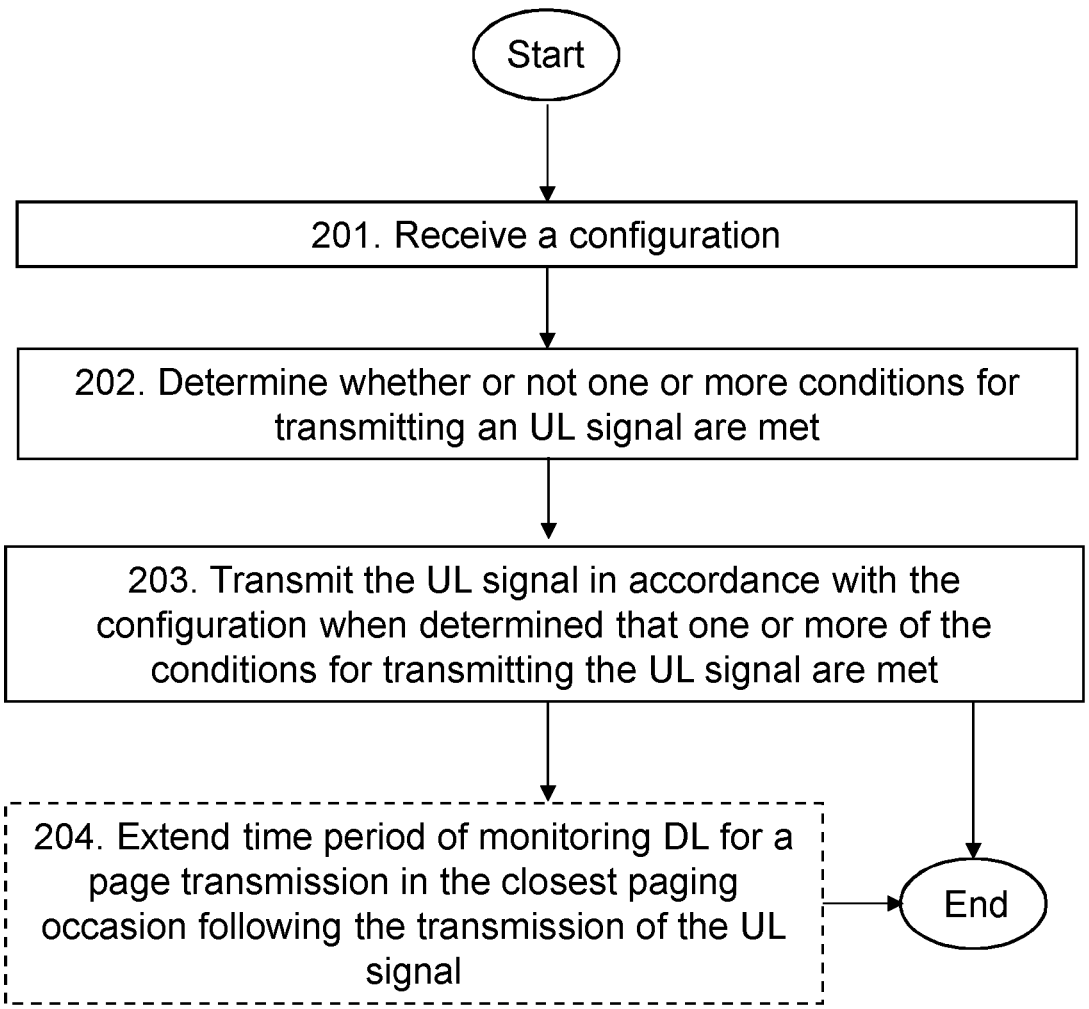
FIG. 2 is a flowchart depicting embodiments of a method performed by a wireless device.

An example of a method performed by the wireless device 110 for supporting optimization of paging of the wireless device 110 in the wireless communications network 100 will now be described with reference to a flowchart depicted in FIG. 2. As mentioned above, the wireless device 110 operates in the wireless communications network 100. This may also be expressed as the wireless device 110 is located in the radio coverage area of the wireless communication network 100.

The methods comprise one or more of the following actions. It should be understood that these actions may be taken in any suitable order and that some actions may be combined.

Action 201

In order to configure the wireless device 110 to transmit an UL signal when one or more conditions is met, the wireless device 110 receives a configuration. The configuration relates to an UL signal and to one or more conditions for when the wireless device 110 is to transmit the UL signal. The configuration may be received from the network node 102,108, such as the core network node 102 or the RNN 108.

The one or more conditions may relate to radio channel quality. For example, the radio channel quality refers to downlink transmissions, i.e. downlink radio channel quality as measured by the wireless device 110. Further, the one or more conditions, sometimes herein referred to as configured conditions, event or triggering event, may comprise that the wireless device 110 should transmit the UL signal while, e.g. only while, in a power saving state, such as an inactive state or an idle state, and while possibly one or more further conditions are met. For example, the one or more further conditions may be related to the cell in which the wireless device is located, the energy available for the wireless device, just to give some examples.

In one example, the transmission of periodical UL beacon signals may be turned on only if the wireless device 110 is located in a cell, i.e. is camping on a cell, where beam sweeping or wide beam repetitions are used for DL transmission of paging and/or common control signals, such as the SS Block).

In another example, the transmission of periodical UL beacon signals may be turned on only if the wireless device has sufficient energy left, e.g. its battery charge is above a certain level. The example should not be interpreted such that the condition is that the wireless device has enough available energy to perform even a single UL beacon signal transmission. It should be interpreted such that the wireless device's available energy has decreased to a point where it is considered more important to save energy in the wireless device than to optimize the paging.

In yet another example, the wireless device may refrain from beacon signal transmission even if the configured condition(s) is(are) met, e.g. if the wireless device has a low battery level or that it relies on its high-end receiver implementation or advanced post-processing abilities to enable it to receive the page despite the poor channel quality and/or low expected received power. A wireless device utilizing this option may e.g. choose to use a stricter channel quality threshold than the configured one to trigger transmission of the beacon signal.

It should be understood that by the expression "power saving state" is meant a state wherein the wireless device 110 saves power, e.g. saves energy, by having a reduced consumption of power, e.g. energy, while being in the power saving state as compared to being in an active state. The power saving state may be referred to as an energy saving state. For example, the power saving state may be an RRC CONNECTED INACTIVE state or an RRC IDLE state.

In some embodiments, the received configuration comprises information that the US signal should be transmitted periodically as long as one or more of the configured conditions are met.

Action 202

The wireless device 110 determines whether or not one or more of the conditions for transmitting the UL signal are met.

As previously mentioned, the one or more conditions may relate to radio channel quality, and thus in some embodiments, the wireless device 110 determines whether or not one or more of the conditions for transmitting the UL signal are met by measuring the radio channel quality and comparing the measuring result with one or more of the configured conditions.

Action 203

The wireless device 110 transmits the UL signal in accordance with the configuration when the wireless device 110 has determined that one or more of the conditions for transmitting the UL signal are met. Thereby, the network node 102,108 receiving the UL signal is informed about the wireless device 110 and that the one or more conditions are met, and the network node 102,104 may transmit a beamformed page in the direction of the wireless device 110 based on the direction from which the UL signal was received, and/or an omnidirectional page or a page transmitted using a wider beam than the beamformed page.

In some embodiments, the wireless device 110 transmits the UL signal periodically as long as one of more of the configured conditions are met. The periodical transmittal of the UL signal may be coordinated with one or more paging occasions of the wireless device 110. A paging occasion is an occasion when the network may page the wireless device and the wireless device consequently has to monitor the paging channel(s), and wherein a paging occasion may be defined as a timeslot. For example, the coordination may be such that the time elapsing between each UL signal transmission instance and the closest following paging occasion is small in relation to the timescale with which the location and/or radio channel conditions of the wireless device 110 change so much that a page transmission beamformed in a direction derived at least in part from the UL signal risk not to reach the wireless device 110 with sufficient power. By the expression "signal risk to not reach the wireless device 110 with sufficient power" when used in this disclosure is meant that the signal may not reach the wireless device 110 with sufficient power for being decodable by the wireless device 110. In other words, the signal may reach the wireless device 110 with insufficient power for being decodable by the wireless device 110. For example, an assessed risk that the wireless device 110 will not be able to decode the transmission exceeds a predetermined threshold.

Action 204

In some embodiments, the wireless device 110 extends the time, e.g. a time period, of monitoring the DL for a page transmission in the closest paging occasion following the transmission of the UL signal. By extending the time period, the wireless device 110 may be able to receive a beamformed page, and/or an omnidirectional page or a page transmitted using a wider beam than the beamformed page.

Figure 3:
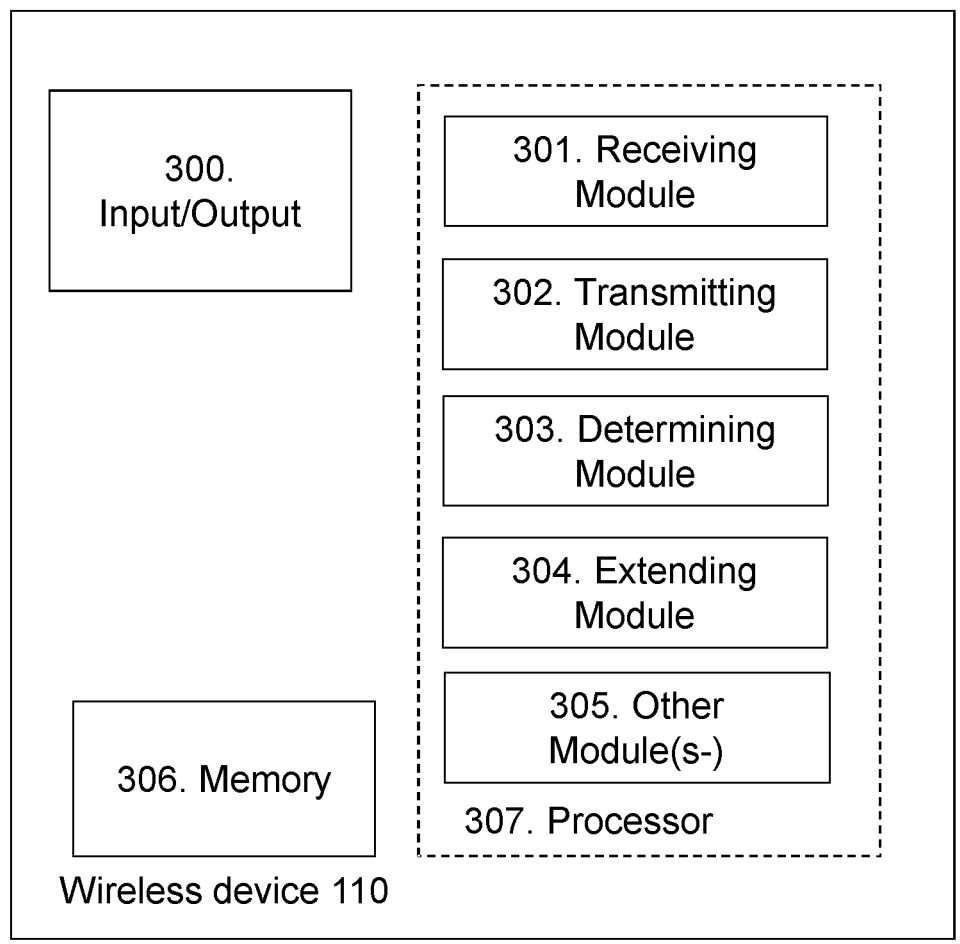
FIG. 3 is a schematic block diagram illustrating embodiments of a wireless device.

To perform the method for supporting optimization of paging of the wireless device 110 in the wireless communications network, the wireless device 110 may be configured according to an arrangement depicted in FIG. 3. As previously described, the wireless device 110 is configured to operate in the wireless communications network 100.

In some embodiments, the wireless device 110 comprises an input and/or output interface 300 configured to communicate with one or more wireless devices, and/or one or more network nodes, e.g. the network node 102,108. The input and/or output interface 300 may comprise a wireless receiver (not shown) and a wireless transmitter (not shown).

The wireless device 110 is configured to receive, e.g. by means of a receiving module 301 configured to receive, a transmission, e.g. a data packet, a signal or information, from one or more network nodes, e.g. the network node 102,108 such as the RNN 108 and/or from one or more neighbouring RNNs 112. The receiving module 301 may be implemented by or arranged in communication with a processor 307 of the wireless device 110. The processor 307 will be described in more detail below.

The wireless device 110 is configured to receive the configuration.

As previously mentioned, the one or more conditions may relate to radio channel quality. As also previously mentioned, the radio channel quality refers to downlink transmissions, i.e. downlink radio channel quality as measured by the wireless device 110.

Further, the one or more conditions, sometimes herein referred to as configured conditions, event or triggering event, may comprise that the wireless device 110 should transmit the UL signal while, e.g. only while, in a power saving state, such as an inactive state or an idle state, and while possibly one or more further conditions are met. As previously mentioned, the one or more further conditions may be related to the cell in which the wireless device is located, the energy available for the wireless device, just to give some examples.

As also previously mentioned, by extending the time period for monitoring the DL for a page transmission, the wireless device 110 may be configured to receive a beamformed page, and/or an omnidirectional page or a page transmitted using a wider beam than the beamformed page.

The wireless device 110 is configured to transmit, e.g. by means of a transmitting module 302 configured to transmit, a transmission, e.g. a data packet, a signal or information, to one or more network nodes, e.g. the network node 102,108 such as the RNN 108 and/or to one or more neighbouring RNNs 112. The transmitting module 302 may be implemented by or arranged in communication with the processor 307 of the wireless device 110.

The wireless device 110 is configured to transmit the UL signal. For example, the wireless device 110 is configured to transmit the UL signal in accordance with the configuration when the wireless device 110 has determined that one or more of the conditions for transmitting the UL signal are met.

The wireless device 110 is configured to perform, by means of a determining module 303 configured to determine, whether or not one or more of the conditions for transmitting the UL signal are met. The determining module 303 may be implemented by or arranged in communication with the processor 307 of the wireless device 110.

As previously mentioned, the one or more conditions may relate to radio channel quality, and thus in some embodiments, the wireless device 110 is configured to determine whether or not one or more of the conditions for transmitting the UL signal are met by being configured to measure the radio channel quality and to compare the measuring result with one or more of the configured conditions. As previously mentioned, the radio channel quality refers to downlink transmissions, i.e. downlink radio channel quality as measured by the wireless device 110.

The wireless device 110 is configured to extend, e.g. by means of an extending module 304 configured to extend, a time period. The extending module 304 may be implemented by or arranged in communication with the processor 307 of the wireless device 110.

The wireless device 110 is configured to extend the time, e.g. a time period, of monitoring the DL for a page transmission in the closest paging occasion following the transmission of the UL signal. As previously mentioned, by extending the time period for monitoring the DL for the page transmission, the wireless device 110 may be configured to receive a beamformed page, and/or an omnidirectional page or a page transmitted using a wider beam than the beamformed page.

In some embodiments, the wireless device 110 is configured to perform, e.g. by means of one or more other modules 305 configured to perform one or more further actions described herein. The one or more other modules may be implemented by or arranged in communication with the processor 307 of the wireless device 110.

The wireless device 110 may also comprise means for storing data. In some embodiments, the wireless device 110 comprises a memory 306 configured to store the data. The data may be processed or non-processed data and/or information relating thereto. The memory 306 may comprise one or more memory units. Further, the memory 306 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the wireless device 110.

Embodiments herein for supporting optimization of paging of the wireless device 110 may be implemented through one or more processors, such as the processor 307 in the arrangement depicted in FIG. 3, together with computer program code for performing the functions and/or method actions of embodiments herein. The program code mentioned above may also be provided as a computer program product, for instance in the form of a data carrier carrying computer program code for performing the embodiments herein when being loaded into the wireless device 110. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the wireless device 110.

Those skilled in the art will also appreciate that the input/output interface 300, the receiving module 301, the transmitting module 302, the determining module 303, the extending module 304, and the one or more other modules 305 above may refer to a combination of analogue and digital circuits, and/or one or more processors configured with software and/or firmware, e.g. stored in the memory 306, that when executed by the one or more processors such as the processors in the wireless device 110 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 4:
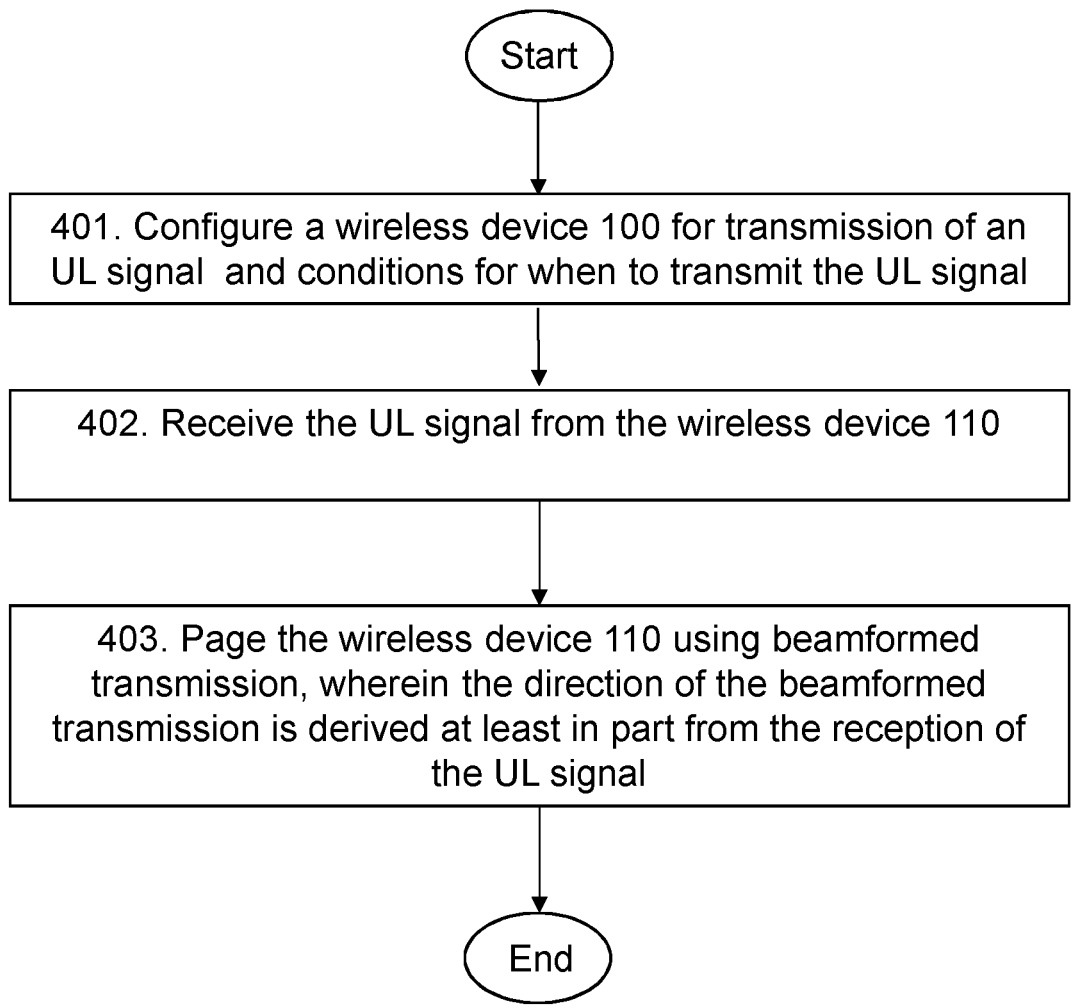
FIG. 4 is a flowchart depicting embodiments of a method performed by a network node.

An example of a method performed by the communications network 100, e.g. by means of the network node 102,108, for optimizing paging in the wireless communications network 100 will now be described with reference to a flowchart depicted in FIG. 4. As mentioned above, the network node 102,108 and the wireless device 110 operate in the wireless communications network 100. This may also be expressed as the wireless device 110 is located in the radio coverage area of the wireless communication network 100.

The methods comprise one or more of the following actions. It should be understood that these actions may be taken in any suitable order and that some actions may be combined.

Action 401

The communications network 100, e.g. by means of the network node 102,108 such as the core network node 102 or the RNN 108, configures the wireless device 110 for transmission of an UL signal, e.g. configures the wireless device 110 with an UL signal, e.g. configured the wireless device 110 for transmission of the UL signal, and with conditions for when the wireless device 110 should transmit the UL signal. The UL signal may be an UL beacon signal. As previously mentioned, the configured conditions may comprise that the wireless device 110 should transmit the UL signal while, e.g. only while, being in a power saving state and when one or more possible further conditions are met. As previously mentioned, the one or more possible further conditions may be be related to the cell in which the wireless device is located, the energy available for the wireless device, just to give some examples.

In some embodiments, the communications network 100, e.g. by means of the network node 102,108 such as the core network node 102 or the RNN 108, configures the wireless device 110 to send the UL signal periodically as long as the configured conditions are met.

The communications network 100, e.g. by means of the network node 102,108 such as the core network node 102 or the RNN 108, may configure the periodic transmitting of the UL signal so that the instances of transmission are coordinated with the paging occasions of the wireless device 110.

Further, the coordination may be such that the time elapsing between each UL signal transmission instance and the closest following paging occasion is small in relation to the timescale with which the location and/or radio channel conditions of the wireless device change so much that the beamformed page transmission risk not to reach the wireless device 110 with sufficient power when the direction of the beamformed transmission is at least in part derived from the reception of the UL signal.

Alternatively this may be expressed as the coordination may be such that the time elapsing between each UL signal transmission instance and the closest following paging occasion is small in relation to the timescale with which the location and/or radio channel conditions of the wireless device change so much that the parameters controlling the beamforming of the page transmission (e.g. antenna weights) have to be significantly changed (wherein "significantly changed" means that if they were not changed the beamformed transmission would not reach the wireless device 110 with sufficient power).

As previously mentioned, by the expression "signal risk to not reach the wireless device 110 with sufficient power" when used in this disclosure is meant that the signal may not reach the wireless device 110 with sufficient power for being decodable by the wireless device 110. In other words, the signal may reach the wireless device 110 with insufficient power for being decodable by the wireless device 110.

Action 402

The communications network 100, e.g. by means of the network node 102,108 such as the core network node 102 or the RNN 108, receives the UL signal from the wireless device 110.

Further, the receiving of the UL signal may comprise determining that the UL signal was sent by the wireless device 110 or by one out of a set of wireless devices, wherein the set comprises at least the wireless device 110.

Thus, the communications network 100, e.g. by means of the network node 102,108 such as the core network node 102 or the RNN 108, may determine whether or not the UL signal was sent by the wireless device 110 or by one out of a set of wireless devices, wherein the set comprises at least the wireless device 110. This is good to know when the communications network 100, e.g. by means the network node 102,108 such as the core network node 102 or the RNN 108, is to page using a beamformed transmission the wireless device transmitting the UL signal.

Action 403

The communications network 100, e.g. by means of the network node 102,108 such as the core network node 102 or the RNN 108, pages the wireless device 110 using beamformed transmission, wherein the direction of the beamformed transmission is derived at least in part from the reception of the UL signal.

In some embodiments, the communications network 100, e.g. by means of the network node 102,108 such as the core network node 102 or the RNN 108, performs the beamformed paging of the wireless device 110 occurs in the first paging occasion following a received UL signal.

The communications network 100, e.g. by means of the network node 102,108 such as the core network node 102 or the RNN 108, may transmit, in addition to the beamformed page, an omnidirectional page or a page transmitted using a wider beam than the beamformed page, e.g. a wide beam as previously defined.

In some embodiments, communications network 100, e.g. by means of the network node 102,108 such as the core network node 102 or the RNN 108, transmits the omnidirectional or wide beam page in close proximity to the beamformed page, e.g. before the beamformed page or after the beamformed page. By the expression "close proximity" when used in this disclosure is meant that the beam page and the omnidirectional or wide beam page are transmitted in time slots being in close proximity to each other, e.g. transmitted in consecutive time slots. In some embodiments, the network node 102,108 may assume that it may only coarsely rely on the direction of arrival of the UL signal, e.g. because so much time has passed since the reception of the UL signal that the wireless device 110 may have moved a significant distance which would cause transmission in a narrow beam in the opposite direction of the reception of the UL signal would risk missing the wireless device 110. In such embodiments, the network node 102,108 may instead transmit a short sweep of narrow beamformed page signals or a wider beam (still directed in the opposite direction of the received UL signal), preferably repeated a number of times (but not as many times as a regular "full" wide beam used for regular paging in some scenarios). Of course, the network node 102,108 may also choose to revert fully to regular paging transmission mechanisms (as if no recent UL signal had been received from the wireless device 110).

It should be understood that one or more of the actions described herein may be performed by one or more nodes operating in the communications network. For example, the configuring of the wireless device 110 and the subsequent UL signal reception and beamformed page transmission may be performed by different nodes. The configuration may likely be performed by the network node, e.g. by the core network node 102 or the RNN 108, where the wireless device 110 last transited to connected/active state (e.g. RRC_CONNECTED state), e.g. an anchor network node, e.g. by the core network node 102 or the RNN 108, in case of the wireless device 110 being in connected/inactive state, while the UL signal reception and beamformed paging of the wireless device 110 may be performed by any RAN node, e.g. the RNN 108, whose radio coverage area (e.g. represented as one or more cell(s)) at least to some part belongs to the paging area of the wireless device 110. It should be understood that configuring of the wireless device 110 for transmission of an UL signal mentioned may also encompass the case when standardization provides the channel quality threshold and the instances for transmitting the UL signal in relation to the paging occasions.

Figure 5:
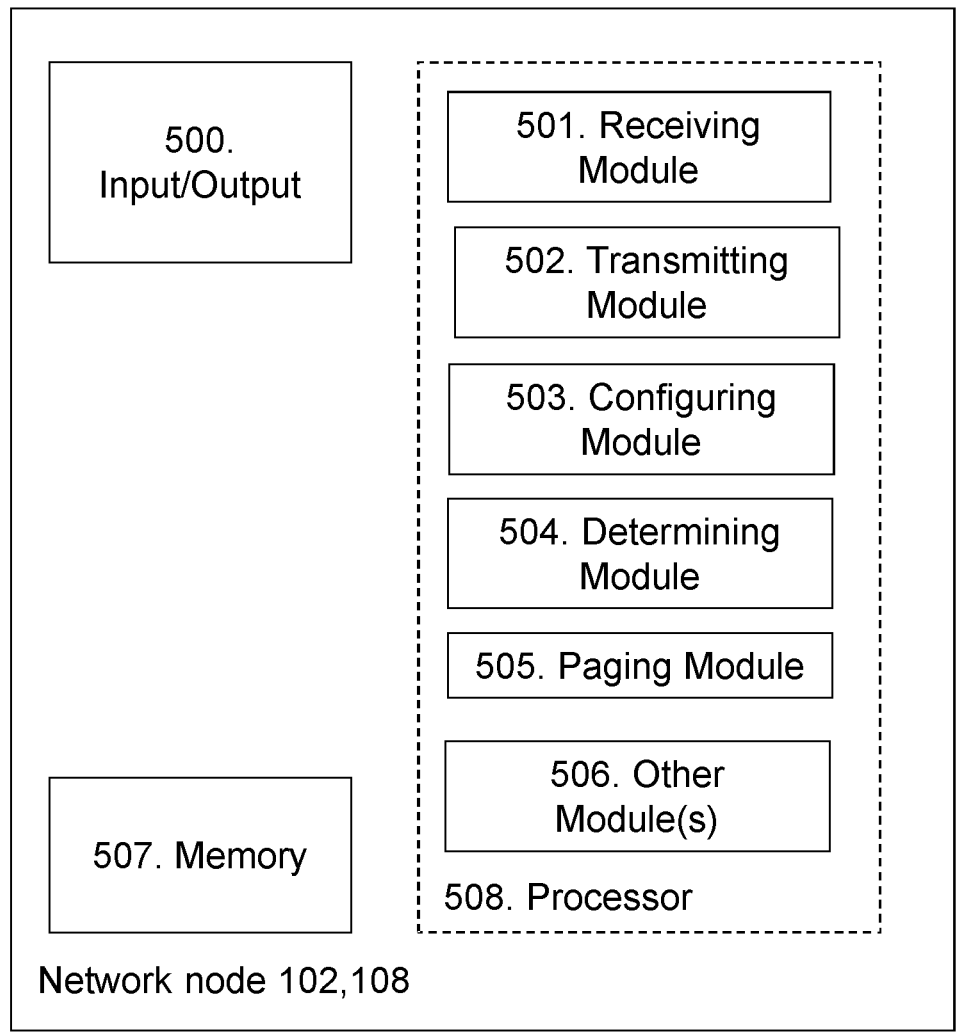
FIG. 5 is a schematic block diagram illustrating embodiments of a network node.

To perform the method for optimizing paging in the wireless communications network, the communications network 100 e.g. the network node 102,108, may be configured according to an arrangement depicted in FIG. 5. As previously described, the network node 102,108 and the wireless device 110 are configured to operate in the wireless communications network 100.

In some embodiments, the network node 102,108 comprises an input and/or output interface 500 configured to communicate with one or more wireless devices, e.g. the wireless device 110 and/or with one or more other network nodes, e.g. the core network node 102 or the RNN 108 and/or with one or more neighbouring RNNs 112. The input and/or output interface 500 may comprise a wireless receiver (not shown) and a wireless transmitter (not shown).

The communications network 100, e.g. by means of the network node 102,108 such as the core network node 102 or the RNN 108, is configured to receive, e.g. by means of a receiving module 501 configured to receive, a transmission, e.g. a data packet, a signal or information, from one or more wireless devices, e.g. the wireless device 110 and/or from one and/or more other network nodes, e.g. from the core network node 102 or the RNN 108 and/or from one or more neighbouring RNNs 112. The receiving module 501 may be implemented by or arranged in communication with a processor 508 of the communications network 100, e.g. the network node 102,108. The processor 508 will be described in more detail below.

In some embodiments, the communications network 100, e.g. by means of the network node 102,108 such as the core network node 102 or the RNN 108, is configured to receive the UL signal from the wireless device 110.

The communications network 100, e.g. by means of the network node 102,108 such as the core network node 102 or the RNN 108, is configured to transmit, e.g. by means of a transmitting module 502 configured to transmit, a transmission, e.g. a data packet, a signal or information, to the wireless device 110 and/or to one or more other network nodes, e.g. the core network node 102 or the RNN 108 and/or with one or more neighbouring RNNs 112. The transmitting module 502 may be implemented by or arranged in communication with the processor 508 of the communications network 100, e.g. the network node 102, 108.

In some embodiments, the communications network 100, e.g. by means of the network node 102,108 such as the core network node 102 or the RNN 108, is configured to transmit a configuration to the wireless device 110.

The communications network 100, e.g. by means of the network node 102,108 such as the core network node 102 or the RNN 108, may be configured to transmit, in addition to the beamformed page, an omnidirectional page or a page transmitted using a wider beam than the beamformed page.

In some embodiments, the communications network 100, e.g. by means of the network node 102,108 such as the core network node 102 or the RNN 108, is configured to transmit the omnidirectional or wide beam page in close proximity to the beamformed page, e.g. before the beamformed page or after the beamformed page. As previously mentioned, by the expression "close proximity" when used in this disclosure is meant that the beam page and the omnidirectional or wide beam page are transmitted in time slots being in close proximity to each other, e.g. transmitted in consecutive time slots.

The communications network 100, e.g. by means of the network node 102,108 such as the core network node 102 or the RNN 108, may be configured to determine, e.g. by means of a configuring module 503 configured to configure, the wireless device 100 for transmission of an UL signal and with conditions for when the wireless device 110 should transmit the UL signal. The configuring module 503 may be implemented by or arranged in communication with the processor 508 of the communications network 100, e.g. the network node 102,108.

As previously mentioned, the configured conditions may comprise that the wireless device 110 should transmit the UL signal while, e.g. only while, being in a power saving state and when one or more possible further conditions are met. As also previously mentioned, the one or more possible further conditions may be related to the cell in which the wireless device is located, the energy available for the wireless device, just to give some examples.

In some embodiments, the communications network 100, e.g. by means of the network node 102,108 such as the core network node 102 or the RNN 108, is configured to configure the wireless device 110 to send the UL signal periodically as long as the configured conditions are met.

The communications network 100, e.g. by means of the network node 102,108 such as the core network node 102 or the RNN 108, may be configured to configure the periodic transmitting of the UL signal so that the instances of transmission are coordinated with the paging occasions of the wireless device 110.

Further, the coordination may be such that the time elapsing between each UL signal transmission instance and the closest following paging occasion is small in relation to the timescale with which the location and/or radio channel conditions of the wireless device change so much that the beamformed page transmission risk not to reach the wireless device 110 with sufficient power when the direction of the beamformed transmission is at least in part derived from the reception of the UL signal.

The communications network 100, e.g. by means of the network node 102,108 such as the core network node 102 or the RNN 108, may be configured to determine, e.g. by means of a determining module 504 configured to determine, whether or not the UL signal was sent by the wireless device 110 or by one out of a set of wireless devices, wherein the set comprises at least the wireless device 110. The determining module 504 may be implemented by or arranged in communication with the processor 508 of the communications network 100, e.g. the network node 102, 108.

The communications network 100, e.g. by means of the network node 102,108 such as the core network node 102 or the RNN 108, is configured to page, e.g. by means of a paging module 505 configured to page, the wireless device 110. The paging module 505 may be implemented by or arranged in communication with the processor 508 of the communications network 100, e.g. the network node 102, 108.

The communications network 100, e.g. by means of the network node 102,108 such as the core network node 102 or the RNN 108, may be configured to page the wireless device 110 using beamformed transmission, wherein the direction of the beamformed transmission is derived at least in part from the reception of the UL signal.

In some embodiments, the network node 102,108 is configured to perform, by means of one or more other modules 506 configured to perform one or more further actions described herein. The one or more other modules may be implemented by or arranged in communication with the processor 508 of the communications network 100, e.g. the network node 102,108.

The communications network 100, e.g. the network node 102,108 such as the core network node 102 or the RNN 108, may also comprise means for storing data. In some embodiments, the communications network 100, e.g. the network node 102,108 such as the core network node 102 or the RNN 108, comprises a memory 507 configured to store the data. The data may be processed or non-processed data and/or information relating thereto. The memory 507 may comprise one or more memory units. Further, the memory 507 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the communications network 100, e.g. the network node 102,108 such as the core network node 102 or the RNN 108.

Embodiments herein for optimizing paging may be implemented through one or more processors, such as the processor 508 in the arrangement depicted in FIG. 5, together with computer program code for performing the functions and/or method actions of embodiments herein. The program code mentioned above may also be provided as a computer program product, for instance in the form of a data carrier carrying computer program code for performing the embodiments herein when being loaded into the communications network 100, e.g. the network node 102,108 such as the core network node 102 or the RNN 108. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the communications network 100, e.g. the network node 102, 108 such as the core network node 102 or the RNN 108.

Those skilled in the art will also appreciate that the input/output interface 500, the receiving module 501, the transmitting module 502, the configuring module 503, the determining module 504, the paging module 505 and the one or more other modules 506 above may refer to a combination of analogue and digital circuits, and/or one or more processors configured with software and/or firmware, e.g. stored in the memory 507, that when executed by the one or more processors such as the processors in the communications network 100, e.g. the network node 102,108 such as the core network node 102 or the RNN 108, perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

SOME EXEMPLIFYING EMBODIMENTS

Some exemplifying embodiments will now be described in more detail.

Some First Exemplifying Embodiments

In some first exemplifying embodiments, the wireless device 110, e.g. the UE, is configured with a beacon signal that is unique for the wireless device 110. This beacon signal configuration and other possible configuration data related to the beacon signal is preferably conveyed to the wireless device 110 using dedicated signalling, e.g. RRC signalling, when the wireless device 110 is in connected/active state.

The wireless device 110 may be configured to transmit the periodical beacon signals, while the event trigger conditions are met, on the UL channel at occasion that are coordinated with the wireless device's 110 paging occasions, such that each beacon signal transmission is followed by a paging occasion. The time between the beacon signal transmission and the paging occasion should be short, e.g. within consecutive subframes/TTIs/timeslots or at least within a couple of hundred milliseconds. This is so that the wireless device's 110 location and the channel conditions change as little as possible, to allow the network node 102, 108, e.g. the RNN 108 such as the gNB, to use directional reciprocity to derive the direction to the wireless device 110. A periodic beacon signal transmission may precede every paging occasion or every Nth paging occasion. The choice of N may depend on the frequency of the paging occasions and tradeoffs between the accuracy of the information provided by the beacon signal transmission and the consumption of UL radio transmission (and UL channel) resources and energy in the wireless device 110. This beacon signal transmission configuration may be conveyed through dedicated signaling (when the wireless device 110 is in connected/active state) or via broadcast system information or may be specified in a standard specification.

If the wireless device 110 is paged in a paging occasion following the reception of a beacon signal from the wireless device 110 to be paged, the network node 102, 108, e.g. the RNN 108 such as the gNB, uses directional reciprocity, based on the direction of arrival of the received beacon signal, to derive the DL beam direction to be used when transmitting the paging related signals (e.g. paging indication and/or paging message) to the wireless device 110. Otherwise, if the network node 102, 108, e.g. the RNN 108 such as the gNB, has no beacon signal reception to guide it, it will send the paging related signals in the regular way, i.e. omnidirectionally or in wide beam(s).

Even if the beacon signal from the wireless device 110 to be paged was not received directly preceding the paging occasion to be used (e.g. one or more paging occasion intervals may have elapsed), the network node 102, 108, e.g. the RNN 108 such as the gNB, may optionally use it to derive wireless device 110 location information that may be used to allow mechanisms for more efficient paging. Such mechanisms may include using a wider beam, using a short sweep of narrow beams, or a smart paging scheme where the area covered by the paging related signals is iteratively increased (e.g. widening the beam or the sweep or switching to omnidirectional transmission), if no response is received from the wireless device 110. The accuracy with which the directional information provided by the beacon signal may be trusted depends on the time that has elapsed since the beacon signal was received and possibly also information about the mobility of the wireless device 110, e.g. based on UE capability information, category information, type information or subscription information.

To allow the network node 102, 108, e.g. the RNN 108 such as the gNB, to know whether a recently received beacon signal originated from a wireless device 110 to be paged, the paging message that is distributed through the network to the gNB, either from the core network, e.g. an MME, or from an anchor RAN node, e.g. a gNB, via the core network or internally through the RAN, should include an indication of the beacon signal assigned to the wireless device 110. Note that if the paging message that is distributed through the network to the gNB does not originate from the same entity/node that assigned the beacon signal, then, to enable this feature, the entity/node that assigns a beacon signal to a wireless device has to inform the entity/node that will be distributing any subsequent paging message to gNB(s) for paging of the concerned wireless device.

In this way, the beacon signal transmissions may be used to optimize, i.e. beamform with a narrow beam, the transmission of the paging related signals only when it is needed, i.e. when the wireless device 110 is in poor coverage. The disadvantageous consequences of the beacon signal transmissions are avoided in situations when no paging optimization is needed (assumedly the majority of the cases).

An option that may be used to optimize the paging in the entire paging area is that the network node 102, 108, e.g. the RNN 108 such as the gNB, receiving a beacon signal from the wireless device 110 informs the entity responsible for distributing paging messages through the network, e.g. the core network node (e.g. an MME) or an anchor RAN node (e.g. a gNB), so the paging message is only distributed to the gNB that received the beacon signal from the concerned wireless device 110 and so that only the network node 102, 108, e.g. the RNN 108 such as the gNB, that may reach the wireless device 110 transmits the paging related signals. An exception may be scenarios where the paging related signals may be sent using Single Frequency Network (SFN) transmission from multiple gNBs/TRPs, in which case the paging message may still be distributed through the network to more than one gNB, i.e. the gNBs taking part in SFN transmission together with the gNB that received the beacon signal.

Various strategies may be used with regards to when the network node 102, 108, e.g. the RNN 108 such as the gNB, that the received the beacon signal from the wireless device 110 informs the entity that is responsible for distributing the paging message through the network. The preferable way may be that the network node 102, 108, e.g. the RNN 108 such as the gNB, informs the concerned entity when it receives the first beacon signal from the wireless device 110 and then subsequently informs the entity when it ceases to receive the periodic beacon signals. Another strategy may be that the network node 102, 108, e.g. the RNN 108 such as the gNB, conveys the information after each received beacon signal but this may lead to unnecessarily excessing network signalling. Yet another strategy could be that the network node 102, 108, e.g. the RNN 108 such as the gNB, conveys the information only after having received a paging message, i.e. when receiving a paging message for a wireless device 110, the network node 102, 108, e.g. the RNN 108 such as the gNB, informs the entity responsible for distributing the paging message through the network that (and if) it has received a recent beacon signal transmission from the wireless device 110 to be paged. With this strategy variant the network node 102, 108, e.g. the RNN 108 such as the gNB, may also be triggered to convey the information if it receives a beacon signal from the wireless device 110 to be paged in between receiving the paging message and the paging occasion to be used for paging the wireless device 110. When the entity responsible for distributing the paging message through the network receives this information, it may try to stop the other gNBs in the paging area, which the paging message has been distributed to, from sending the paging related signalling in order to save DL radio and signalling resources.

In all the above strategies the target for the information about the received beacon signal, i.e. the entity responsible for distributing the paging message through the network, may be replaced by other gNBs in the paging area. That is, the network node 102, 108, e.g. the RNN 108 such as the gNB, may distribute the information to the other gNBs in the paging area, e.g. directly to each gNB or to the subset of the involved gNBs that it may reach direction, e.g. through an X2-like inter-gNB interface or using hop-by-hop forwarding via the involved gNBs also known as "flooding".

When the entity responsible for distributing the paging message through the network is about to initiate paging of the wireless device 110 for which it has recently received, or receives in response to the paging message, information that a certain gNB has received a beacon transmission from the concerned wireless device 110, the entity may utilize this information to employ smart paging schemes in the paging area. Such a smart paging scheme may be to iteratively increase or change the set of gNBs or cells taking part in the page, i.e. to which the paging message is distributed, if the no response is received from the wireless device 110. The wireless device 110 may e.g. be paged by a single gNB first and then, as a second step if needed, by the other gNBs in the paging area. Another example could be that the wireless device 110 is paged by a single gNB and/or cell first and then in a subset of the gNBs or cells surrounding and excluding the gNB that performed the first paging iteration, and then the remaining gNBs in the paging area as a third step.

Some Second Exemplifying Embodiments

In some second embodiments, the wireless device 110, e.g. the UE, is not assigned a unique beacon signal, but a beacon signal that may be shared by multiple UEs.

Instead of a unique beacon signal, the wireless device 110 is assigned a "beacon index". As one example, the beacon signal is identical to a random access preamble, or, alternatively, some other signal with similar properties. In LTE the available random access preambles are not reused in every cell, but are planned with a reuse distance to avoid ambiguity as to which cell a preamble transmission is intended for. It is not unlikely that a similar approach may be used in NR and in any case, such an approach may be used for the beacon signals in some second embodiments.

Hence, in some second embodiments, each NR cell has a set of beacon signals, e.g. random access preambles or some similar signal. The beacon signals in the set may vary from cell to cell and are announced in the system information. The beacon index assigned to the wireless device 110 indicates which beacon signal in the set the wireless device 110 should use when it transmits a beacon signal. For instance, if all cells have a set of beacon signals consisting of N beacon signals, then each wireless device 110 is assigned an index, n, in the range $n \in [1 \ldots N]$ (or $n \in [0 \ldots N-1]$), indicating which beacon signal in the set the wireless device 110 should use. Since different cells use different sets, the index assigned to the wireless device 110 will correspond to different beacon signals in different cells.

When a paging message is distributed to a gNB, from the core network 104, internally through the RAN 106 or from a RAN anchor node via the core network 104, the paging message includes the index assigned to the wireless device 110 to be paged. The network node 102, 108, e.g. the RNN 108 such as the gNB, checks whether it has recently received a beacon signal corresponding to that index. If it has, or if it receives such a beacon signal before the next paging occasion for the concerned wireless device 110, the gNB beamforms the paging related signal transmission in the direction of the wireless device 110, i.e. in the opposite direction of the received beacon signal, otherwise it uses the default method, e.g. omnidirectional or wide beam transmission.

But, as mentioned above, the same index may be shared by multiple wireless devices. This means that the beacon signal corresponding to the index assigned to the wireless device 110 to be paged, and that the network node 102, 108, e.g. the RNN 108 such as the gNB, uses to determine the direction of the beamformed paging related signal transmission, may actually have been sent by another wireless device than the one that is the target of the page. This may actually occur quite frequently—even the majority of the cases—if more than two wireless devices share the same index. The consequence is that the beamformed transmission is likely to be directed in the wrong direction. No harm would be done if the correct wireless device 110 is not located in the cell, but if it is, the wireless device 110 will miss, i.e. fail to receive, the page. To overcome this issue, the network node 102, 108, e.g. the RNN 108 such as the gNB, which has received a beacon signal that may have been sent by the wireless device 110 it is about to page, should transmit an omnidirectional beam page or possibly a wide beam page followed by a beamformed page.

A consequence of the dual paging transmission scheme, i.e. both omnidirectional and beamformed paging transmissions, is that the wireless device 110 that has transmitted a beacon signal has to extend the length of its next paging occasion. If the two paging transmissions are sent in consecutive resources, then the paging occasion length is doubled. If they are sent in non-contiguous resources, then the wireless device 110 could sleep in between the two resources, i.e. it would in practice be two paging occasions. If the wireless device 110 receives a paging transmission intended for it, e.g. the first of the two paging transmissions, the wireless device 110 does not have to monitor the paging channel for the second paging transmission.

A wireless device that has not transmitted a beacon signal still only has to monitor the regular paging occasion, since the omnidirectional page will be transmitted first and that should correspond with the regular paging occasion.

Optionally, it may be defined, via configuration or standard specification, that the time between the wireless device's 110 configured instance for potential beacon signal transmission and the wireless device's 110 subsequent paging occasion must not exceed a certain maximum time period. This would aid the network node 102, 108, e.g. the RNN 108 such as the gNB, to choose whether to use beamforming or not for a concerned page. That is, even if the network node 102, 108, e.g. the RNN 108 such as the gNB, has received a beacon signal that may have been sent by the wireless device 110 to be paged, the network node 102, 108, e.g. the RNN 108 such as the gNB, will not use narrow beamforming if the time between the beacon signal reception and the paging occasion exceeds the maximum threshold because the elapsed time indicates that the beacon signal was sent by another wireless device sharing the same index. An additional option, which allows more flexibility to configure different time periods for different wireless devices, is that this maximum time period is indicated in the paging message distributed through the network to the network node 102, 108, e.g. the RNN 108 such as the gNB. This assumes that the entity distributing the paging message is the same entity that configured the wireless device 110 for the beacon signal transmissions (which is a reasonable assumption) or that the entities exchange this information, in case they are not the same.

This embodiment not only avoids the scalability issues of the prior art UL beacon based solution in terms of UL transmission resource consumption and interference, but also addresses the scalability problem of assigning unique beacon signals to all wireless devices. And notably, the disadvantage in the form of redundant page transmissions, i.e. dual transmissions and beamformed page transmissions directed in the wrong direction, will be fewer the larger the set of beacon signals is and the smaller the paging area is, because of the reduced number of wireless devices that will have to share the same index in the same paging area. The prolonged paging occasion is also a slight disadvantage, but this would occur in only a subset (hopefully minority) of the cases and the extension of the wireless device's wake period is still much shorter than would be the case if a full beam sweep were to be used.

The description above mentions the assumption that the beacon signals in the set vary between cells. But note that this is by no means a prerequisite for the solution; the solution works also with full reuse of the beacon signals, i.e. with all cells using the same set of beacon signals. The point is to not assign a unique beacon signal to each wireless device, but instead one that is shared by multiple wireless devices.

A similar variation of some second embodiments is to skip the indexed set, but to still only use a limited number of beacon signals, which do not allow each wireless device to receive a unique beacon signal. The wireless device 110 would use the same beacon signal in all cells and the beacon signal assigned to the UE would be indicated in the paging message distributed from the core network, from an anchor RAN node through the RAN or from an anchor RAN node via the core network. So, except for the elimination of the indexed set, this variant would work in the same was as described above.

The same means for conveying the configuration to the wireless device 110 may be used as in some first embodiments. Likewise, the option of using smart, e.g. iterative, paging schemes in the network node 102, 108, e.g. the RNN 108 such as the gNB, as well as the option of informing other entity/entities about the UL signal reception and the thereby enabled paging area level iterative paging schemes, as described in some first embodiments, may also be used in some second embodiments. However, the uncertainty as to whether the received beacon signal was actually sent by the wireless device 110 to be paged makes these options less suitable for some second embodiments than for some first embodiments. Especially so for the latter option, if multiple gNBs in the paging area have received beacon signal transmissions that may have originated from the wireless device 110 to be paged.

Some Third Exemplifying Embodiments

Some third embodiments relate to an extreme version of some second embodiments, wherein only one beacon signal, e.g. a random access preamble, is available. This means that when a wireless device, e.g. the wireless device 110, is to be paged following a received beacon signal, the mechanisms of some second embodiments are employed, irrespective of which wireless device that is being paged. An exception may be if some wireless devices are exempt from the beacon signal transmission scheme (i.e. not configured with any beacon signals), in which case the gNB would use the regular transmission mechanism (i.e. omnidirectional transmission, wide beam(s) and/or full sweep of narrow beams), if the wireless device to be paged is one of the exempt wireless devices.

Some Further Exemplifying Embodiments

Optional Transmission of the Beacon Signal

A possible extension of one or more of the embodiments disclosed herein may be that the transmission of the beacon signal when the conditions for transmission are met is made optional for the wireless device 110. In essence, the wireless device 110 would be allowed to "pollute" the air and load the communications network with beacon signal transmissions when the conditions that imply poor coverage are met, but it will not have to do it. Reasons to refrain from beacon signal transmission may be e.g. that the wireless device 110 has a low battery level or that it relies on its high-end receiver implementation or advanced post-processing abilities to enable it to receive the page despite the poor channel quality and/or low expected received power. A wireless device 110 utilizing this option may e.g. choose to use a stricter channel quality threshold than the configured one to trigger transmission of the beacon signal.

Short Sweep of Narrow Beams Instead of a Single Narrow Beam

A possible variation of some embodiments disclosed herein may be that the network node 102, 108, e.g. the RNN 108 such as the gNB, uses a short sweep of narrow beams instead of a single narrow beam, when paging the wireless device 110 in a paging occasion following the reception of a beacon signal from the wireless device 110. The wireless device 110 should then be configured accordingly to monitor the DL for page transmissions during the paging occasion for enough time to allow reception of any of the transmissions in the short beam sweep.

Using the Solution to Enable DL Transmission of Data in RRC CONNECTED INACTIVE State Another possible extension or variation of some embodiments disclosed herein may is to use one or more of them to enable DL transmission of (small) amounts of data in RRC CONNECTED INACTIVE state, in which case the amount of data to be conveyed is larger than during a regular page and the coverage problems hence will be more pronounced.

Abbreviation Explanation

3GPP 3$^{rd}$ Generation Partnership Project
5G 5$^{th}$ Generation
DL Downlink
DRX Discontinuous Reception
eNB Evolved NodeB
gNB The NR term corresponding to the term eNB in LTE.
IMSI International Mobile Subscriber Identity
NR New Radio
PDCCH Physical Downlink Control Channel
PDSCH Physical Downlink Shared Channel
PRACH Physical Random Access Channel
FFS For Further Study
LTE Long Term Evolution
MeNB Master eNB
MME Mobility Management Entity
MTC Machine Type Communication
NR New Radio
OFDM Orthogonal Frequency Division Multiplex
PCI Physical Cell Identity
PRACH Physical Random Access Channel
P-RNTI Paging RNTI
RAN Radio Access Network
RNTI Radio Network Temporary Identifier
RRC Radio Resource Control
RS Reference Signal
RSRP Reference Signal Received Power
SAE System Architecture Evolution
SeNB Secondary eNB
SFN Single Frequency Network
SS Synchronization Signal
S-TMSI SAE Temporary Mobile Subscriber Identity
T/F Time/Frequency
TRP Transmission/Reception Point
UE User Equipment
UL Uplink
X2 The interface between two eNBs in LTE. The term/name for the corresponding interface in NR (i.e. the interface between two gNBs) has not been coined yet.

When the word "comprise" or "comprising" is used in this disclosure it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a network node for optimizing paging in a wireless communications network, the method comprising:
   transmitting configuration information to a wireless device of the communication network, the configuration information indicating a configuration of the wireless device for transmission of an uplink ("UL") signal, indicating conditions for when the wireless device should transmit the UL signal, and instructing the wireless device to send the UL signal periodically as long as the conditions are met;
   receiving the UL signal from the wireless device; and
   paging the wireless device using beamformed transmission in a direction based on the UL signal,
   wherein transmitting the configuration information instructing the wireless device to send the UL signal periodically comprises transmitting configuration information instructing the wireless device to coordinate transmissions of the UL signal with the paging of the wireless device.

2. The method of claim 1, wherein the conditions include a radio channel quality threshold.

3. The method of claim 1, wherein transmitting the configuration information further comprises transmitting the configuration information indicating that the wireless device transmit the UL signal while in a power saving state.

4. The method of claim 1, wherein transmitting configuration information instructing the wireless device to coordinate transmissions of the UL signal comprises instructing the wireless device to coordinate transmissions of the UL signal such that a time elapsing between each UL signal transmission instance and the closest following paging occasion is small in relation to a timescale with which a location and/or a radio channel condition of the wireless device change so much that the beamformed page transmission may reach the wireless device with insufficient power for being decodable by the wireless device.

5. The method of claim 1, wherein paging the wireless device using beamformed transmission comprises responsive to receiving the UL signal, paging the wireless device during a first paging occasion.

6. The method of claim 1, wherein paging the wireless device using beamformed transmission comprises transmitting a beamformed page, the method further comprising:
transmitting an omnidirectional page.

7. The method of claim 6, wherein the omnidirectional page is transmitted close in time to the beamformed page.

8. The method of claim 1, the method further comprising:
responsive to receiving the UL signal, determining that the UL signal was sent by the wireless device or by one out of a set of wireless devices, wherein the set includes at least the wireless device.

9. A network node for optimizing paging in a wireless communications network, the network node comprising:
processing circuitry; and
memory coupled to the processing circuitry and having instructions stored therein that are executable by the processing circuitry to cause the network node to perform operations, the operations comprising:
transmitting configuration information to a wireless device of the communication network, the configuration information indicating a configuration of the wireless device for transmission of an uplink ("UL") signal, indicating conditions for when the wireless device should transmit the UL signal, and instructing the wireless device to send the UL signal periodically as long as the conditions are met;
receiving the UL signal from the wireless device; and
paging the wireless device using beamformed transmission in a direction based on the UL signal,
wherein transmitting the configuration information instructing the wireless device to send the UL signal periodically comprises transmitting configuration information instructing the wireless device to coordinate transmissions of the UL signal with the paging of the wireless device.

10. The network node of claim 9, wherein the conditions include a radio channel quality threshold.

11. The network node of claim 9, wherein transmitting the configuration information further comprises transmitting the configuration information indicating that the wireless device transmit the UL signal while in a power saving state.

12. The network node of claim 9, wherein transmitting configuration information instructing the wireless device to coordinate transmissions of the UL signal comprises instructing the wireless device to coordinate transmissions of the UL signal such that a time elapsing between each UL signal transmission instance and the closest following paging occasion is small in relation to a timescale with which a location and/or a radio channel condition of the wireless device change so much that the beamformed page transmission may reach the wireless device with insufficient power for being decodable by the wireless device.

13. The network node of claim 9, wherein paging the wireless device using beamformed transmission comprises responsive to receiving the UL signal, paging the wireless device during a first paging occasion.

14. The network node of claim 9, wherein paging the wireless device using beamformed transmission comprises transmitting a beamformed page, the operations further comprising:
transmitting page transmitted using a wider beam than the beamformed page close in time to the beamformed page.

15. The network node of claim 9, the operations further comprising:
responsive to receiving the UL signal, determining that the UL signal was sent by the wireless device or by one out of a set of wireless devices, wherein the set includes at least the wireless device.

16. A non-transitory computer readable medium having instructions stored therein that are executable by processing circuitry of a network node to perform operations for optimizing paging in a wireless communications network, the operations comprising:
transmitting configuration information to a wireless device of the communication network, the configuration information indicating a configuration of the wireless device for transmission of an uplink ("UL") signal, indicating conditions for when the wireless device should transmit the UL signal, and instructing the wireless device to send the UL signal periodically as long as the conditions are met;
receiving the UL signal from the wireless device; and
paging the wireless device using beamformed transmission in a direction based on the UL signal,
wherein transmitting the configuration information instructing the wireless device to send the UL signal periodically comprises transmitting configuration information instructing the wireless device to coordinate transmissions of the UL signal with the paging of the wireless device.

17. The non-transitory computer readable medium of claim 16, wherein the conditions include a radio channel quality threshold.

18. A non-transitory computer readable medium having instructions stored therein that are executable by processing circuitry of a network node to perform operations for optimizing paging in a wireless communications network, the operations comprising:
transmitting configuration information to a wireless device of the communication network, the configuration information indicating a configuration of the wireless device for transmission of an uplink ("UL") signal and conditions for when the wireless device should transmit the UL signal;
receiving the UL signal from the wireless device; and
paging the wireless device using beamformed transmission in a direction based on the UL signal by transmitting a beamformed page; and
transmitting at least one of: an omnidirectional page and a page transmitted using a wider beam than the beamformed page close in time to the beamformed page either before the beamformed page or after the beamformed page.

19. The non-transitory computer readable medium of claim 18, wherein transmitting the configuration information instructing the wireless device to send the UL signal periodically comprises transmitting configuration information instructing the wireless device to coordinate transmissions of the UL signal with the paging of the wireless device.

20. The non-transitory computer readable medium of claim 18, wherein the conditions include a radio channel quality threshold.

* * * * *